United States Patent [19]

Veale

[11] 3,731,206

[45] May 1, 1973

[54] MULTIPLYING CIRCUIT WITH PULSE DURATION CONTROL MEANS

[75] Inventor: John R. Veale, London, England

[73] Assignee: Xerox Corporation, Rochester, N.Y.

[22] Filed: Oct. 14, 1970

[21] Appl. No.: 80,707

Related U.S. Application Data

[62] Division of Ser. No. 731,857, May 24, 1968.

[52] U.S. Cl. ....................328/58, 307/237, 307/246, 307/267, 328/183, 328/160

[51] Int. Cl. ....................H03k 5/04

[58] Field of Search....................307/237, 246, 263, 307/265, 267; 328/58, 160, 183

[56] References Cited

UNITED STATES PATENTS

| | | | |
|---|---|---|---|
| 3,205,448 | 9/1965 | Bahrs et al. | 307/237 X |
| 3,053,996 | 9/1962 | Stefanov | 307/265 X |
| 3,346,743 | 10/1967 | Strenglein | 307/267 |
| 3,094,667 | 6/1963 | Brown | 307/263 X |
| 2,987,633 | 6/1961 | Pallas | 307/267 X |
| 2,995,710 | 8/1961 | Beesley | 328/58 |
| 3,214,696 | 10/1965 | Hickey | 307/265 X |
| 3,473,050 | 10/1969 | Groom | 307/267 |
| 3,571,626 | 3/1971 | Reif | 307/267 |

*Primary Examiner*—John S. Heyman
*Attorney*—Ronald Zibelli et al.

[57] ABSTRACT

A multiplying circuit wherein a capacitor is charged at a constant rate for the duration of an input pulse and then discharged at another constant rate. The total of the charge and discharge times is a predetermined multiple of the input pulse duration. A pulse generator supplies an output pulse having a duration equal to the sum of the capacitor charge and discharge times.

2 Claims, 14 Drawing Figures

INVENTOR
JOHN R. VEALE
BY [signature]
ATTORNEY

MULTIPLYING CIRCUIT WITH PULSE DURATION CONTROL MEANS

This application is a division of U.S. Application Ser. No. 731,857 filed May 24, 1968.

BACKGROUND OF THE INVENTION

The present invention relates to facsimile systems and specifically to method and apparatus for obtaining an in-phase relation between rotating turrets in remotely located facsimile transceivers.

A transceiver is a facsimile device capable of either transmitting or receiving video information over a transmission medium. The transceivers of the present system utilize synchronously rotating turrets having scan and print transducers, or heads, mounted on their peripheries to scan and reproduce graphic information. The transceiver, when performing as a transmitter, optically scans graphic information on a document converting information from optical to electrical form. The electrical video information is transmitted over a suitable transmission medium to a receiver. The electrical video signal is applied to the receiver print head which reproduces the graphic information on a copy sheet. The receiver reproduces the information on the copy sheet generally in the same location that it is located on the document in the transmitter. To accomplish this, the scan head in the transmitter and the print head in the receiver must begin scanning the document and copy sheet at substantially the same instant in time. That is, the scan head in the transmitter and the print head in the receiver need be aligned to a predetermined angular relationship (be in-phase) prior to the transmission of the video information.

The present phase correction system employs simple and efficient methods and apparatus to align the remotely located turrets to the predetermined angular relationship. Misalignment of the turrets from the desired angular relation, the phase angle error, is reduced by a constant amount during successive sample periods until the magnitude of the error is comparatively small. From this point, the phase angle error is repeatedly reduced by fractional amounts until its magnitude has no practical effect on the location of graphic information on the copy sheet in the transmitter. One reason for making fractional corrections is to prevent overcorrection of the error, i.e., overshooting the predetermined angular relation. Safeguarding against overcorrections permits the system to be greatly simplified because the system is not required to detect an overcorrection or effect a change in the polarity of the corrections to compensate for an overshoot.

In aligning the turrets, the present system relies on electrical circuitry without requiring the addition of complicated mechanical apparatus to the facsimile system. The circuitry monitors the phase angle error or misalignment of the turrets and issues commands which control the angular velocity of one turret relative to the other. The relative velocity between turrets is used to reduce the error. In developing electrical signals to control the relative velocities between turrets, the circuitry employs what are essentially analog techniques thereby avoiding use of storage buffers and extensive logic circuitry associated with digital circuitry techniques.

It is therefore an object of the present invention to provide simplified and improved phasing methods in facsimile systems.

Another object of the present invention is to devise simplified electrical means for aligning two rotating shafts to a particular phase angle relation.

Another object is to reduce phase angle error between rotating shafts by a fractional amount during successive time periods.

It is another object of the present invention to devise novel and simplified means for measuring and correcting phase angle errors between electrical signals.

Still another object of the present invention is to vary the phase angle relation between electrical signals of the same frequency.

A still further object of the invention is to provide novel multiplying circuits.

SUMMARY OF THE INVENTION

The aligning or phasing of the turrets is accomplished by monitoring electrical position signals indicating the instantaneous angular position of the two turrets. An error signal representative of the phase angle error between the turrets is produced by measuring the time lapse between generation of a receiver electrical position signal and generation of a transmitter electrical position signal. The error signal is used to produce a correction signal which controls the speed of the receiver turret. The correction signal is a variable width pulse signal having a duration proportional to the error signal. The correction signal is produced by a multiplying circuit of which there are two embodiments. One embodiment employs constant current sources to charge a capacitor and the other uses constant potential sources to charge a capacitor. The correction signal switches the receiver turret between a normal operating angular velocity and a phasing velocity to enable the transmitter turret to overtake the receiver turret. The error and correction signals are generated during successive sample periods of established duration. When the duration of the correction signal is longer than that of a sample period the error is reduced by a constant amount each sample period. When the duration of the correction signal is less than that of a sample period of error is reduced by a fractional amount each sample period. The sample periods continue until the error is reduced to a negligible magnitude. The number of sample periods employed is determined by the degree of accuracy sought for a particular facsimile system.

DESCRIPTION OF THE DRAWINGS

Other objects and features of the present invention are apparent from the description of the present invention as read in light of the accompanying drawings which are now identified.

FIG. 5(*b*) illustrates a signal waveform for the circuit of FIG. 5(*a*).

FIGS. 8(*b*) and 8(*c*) show the waveforms of signals produced by the circuit in FIG. 8(*a*).

DETAILED DESCRIPTION

Figure 1:
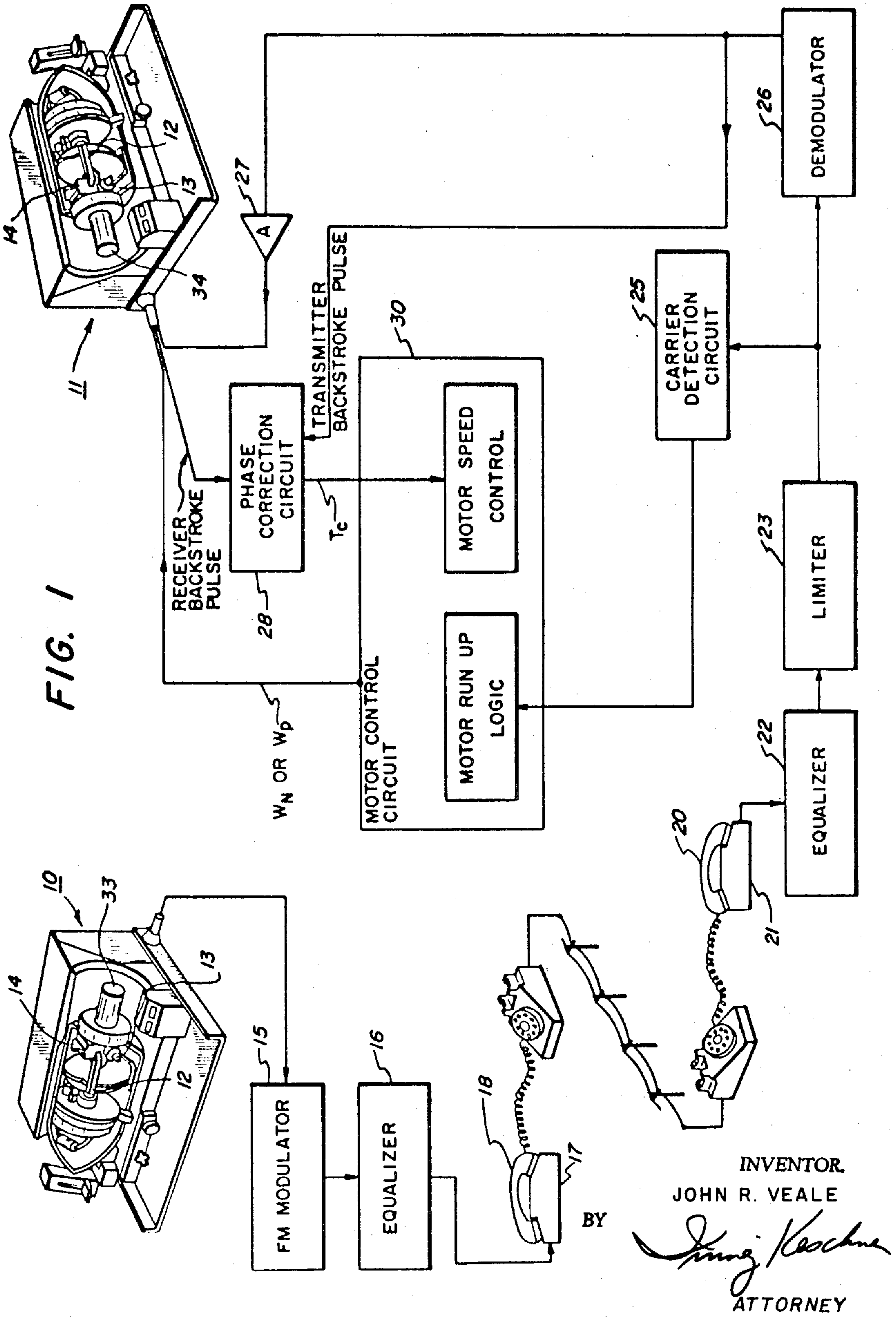
FIG. 1 is a block diagram of a facsimile system in which the present phase correction circuit is used.

FIG. 1 is a block diagram of a facsimile system in which the present phasing apparatus is employed. Transceivers 10 and 11 are facsimile devices capable of performing either as a transmitter or as a receiver of video information. In the block diagram of FIG. 1, transceiver 10 is a transmitter and transceiver 11 is a receiver. Each transceiver has a rotating turret 12 with two scan heads 13 and two print heads 14 mounted about the periphery of the turret at 90° intervals. The scanning heads are mounted 180° from each other and 90° from each print head. When a transceiver is used as a transmitter, a document containing graphic information is advanced along the axis of rotation of the turret past the scanning heads. The document is scanned twice during each revolution of the turret due to the 180° spacing of the scan heads. The scanning heads include a lens system which directs light reflected from the surface of the document to a photodiode. The photodiode generates an amplitude modulated (AM) signal of an amplitude proportional to the intensity of the light reflected from the document. This AM video signal is converted to a frequency modulated (FM) signal and transmitted over a telephone line or other transmission medium to a facsimile receiver.

The AM video signal produced by the transmitter photodiode is converted to FM signal form by modulator 15. The output of the modulator is applied to a telephone handset 18 through equalizer 16 and coupler 17. The coupler converts the FM video signal to audible tones within the audio range of a standard telephone handset. Equalizer 16 compensates for the amplitude vs. frequency response and envelope delay of the telephone network. The facsimile system employs a bandwidth of approximately 1500 to 2500 cycles per second, which is within the bandwidth of telephone networks. The frequency variations, or tonal variations, indicate the various dark and light shades detected by the transmitter scan heads.

Receiver 11 receives the video information through telephone handset 20. Coupler 21 converts the audio sounds produced at the handset back into a frequency modulated signal. The FM video information passes through equalizer 22 used to match characteristics of the telephone network as mentioned above. The transmitted signal is then applied to limiter 23 to convert the FM information into a train of constant amplitude pulses occuring at the frequency of the FM video signal. The limiter prevents malfunctions from occurring in the receiver due to the variations in the amplitude of the FM video signal. From this point, the signal is fed to demodulator 26 where the FM pulse information is converted into AM signal form. This AM signal is used to drive the receiver printing heads to record the transmitted information onto a copy sheet. The copy sheet is advanced past the printing transducers in the same manner as the original document is driven past the scanning heads of the transmitter 10.

The receiver and transmitter turrets must be in-phase if the transmitted information is to be properly placed onto the copy sheet in the receiver. The receiver and transmitter turrets are in-phase when a scan head in the transmitter and a print head in the receiver are angularly displaced relative to each other by a predetermined fixed angle. In the embodiment under discussion, this angle is 0° thereby permitting a scan head and print head to begin a scan of a document and copy sheet at substantially the same instant in time during the rotation of their respective turrets.

The facsimile system also requires that the transmitter and receiver turrets be rotated at the same speed, i.e., be in synchronization with each other. Synchronization of the turrets is accomplished by employing highly stable crystal oscillators to establish the frequency for the energy sources driving the transmitter and receiver turret synchronous electric motors 33 and 34.

Initially, both transceiver turrets are at rest and begin rotation in response to a start command issued at the transmitter and sent to the receiver over the telephone line. The start command is monitored in the receiver by carrier detection circuit 25 and is applied to the receiver motor control circuit 30 to activate the receiver turret motor. Automatic delay circuits (not shown) are provided in the transmitter and receiver to delay transmission of video information for a short period of time (e.g., around 15 seconds) to permit phase correction circuit 28 to bring the turrets of the two machines into alignment. The phase correction circuit aligns the turrets by issuing commands to the receiver motor to alter its speed.

The alignment of the two turrets is accomplished by running one turret at a normal operating speed and by running the other at a speed different from the normal speed. In this way, the relative velocities of the turrets permits one turret to overtake the other. In the present system the receiver turret speed is varied by a fixed amount and the transmitter turret speed is held constant. The phase correction circuit monitors the phase relationship of the turrets while operating at fixed but different velocities and switches the receiver turret to the normal operating speed when it is overtaken by the transmitter turret.

It is preferable to switch between fixed motor speeds rather than to vary the speed continuously because of the difficulties encountered with variable frequency oscillators. Synchronous AC motors are used in the present system. The speed of these motors is controlled by varying the frequency of the electrical signals driving the motors. It has been found to be simpler and less expensive to control motor speed by switching an oscillator between two fixed frequencies rather than by continuously varying an oscillator frequency. This is because it is difficult to devise a variable frequency oscillator which is sufficiently stable to compete with the stability of fixed frequency oscillators. Nonetheless, the present method can be employed with a system having variable motor speed control. Modifications necessary to accomplish this change are explained following the present description.

The system herein described brings two shafts, or pulse trains having frequencies corresponding to the shaft rotations, into phase alignment by moving one shaft, or pulse, from one direction toward the other. The homing-in operation is limited to one direction for simplicity. Again, the present system can be modified to permit the correction to be made from two directions, i.e., by both speeding up and slowing down one shaft with respect to the other. This operation is also explained later.

A two-direction correction scheme is not used in the present system because the benefits derived (saving in phasing time) is not worth the additional complication to the system. The maximum phase angle error encountered in the present system approaches 180°. In a two-direction system the maximum error approaches 90°. The present system can reduce an error greater than 90° to less than 45° in a relatively short period of time and thereafter operates as fast as a two-direction system. The time required to reduce an error from 179° to less than 90° is short relative to the entire phasing period. Therefore, the saving of time attained using a two-direction system is not necessarily worth the added complication to the system.

Figure 2:
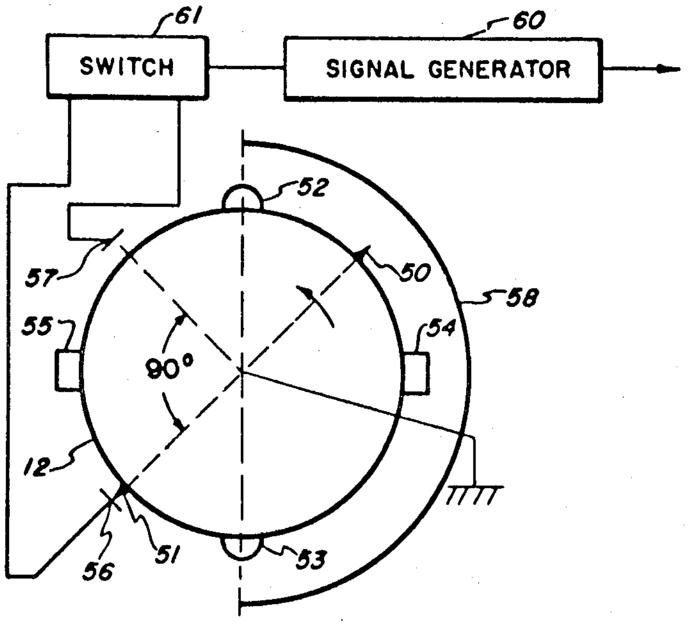
FIG. 2 illustrates a cross-section of a transceiver turret and a circuit for generating signals indicative of the angular position of the turret.

The phase correction circuit monitors the phase angle difference between pulse trains generated by the transceivers to determine the angular position of the two turrets relative to each other. The pulses, called backstroke pulses, are generated by contacts mounted on the periphery of the transceiver turrets. A circuit for generating backstroke pulses is shown in FIG. 2. Contacts 50 and 51 are mounted 180° apart on the periphery of the turret and are positioned relative to the scan and print heads so that one of them touches either mating contact 56 or 57 when the turret is in a dead zone position. The dead zone position is that angular position of the turret at which a scan head or print head is aligned opposite the edge of a copy sheet or document 58. FIG. 2 shows a cross section of turret 12 with scan heads 52 and 53 in the dead zone position. That is, scan head 53 is at a position to begin scanning document 58 and scan head 52 is at a position where it just completed a scan of document 58. A dead zone is also encountered when print heads 54 and 55 are aligned opposite the edges of copy sheet 58, i.e., when print head 54 is at a position to start the scan of a copy sheet and print head 55 is at a position where it just completed a scan of copy sheet 58. Dead zones occur at intervals less than 180° if the scan and print heads are mounted at different angular positions on the periphery of the turret. It is not necessary, although it is preferable, to generate the backstroke pulses at the dead zones.

When contacts 50 and 51 touch mating contacts 56 and 57, a ground is provided for pulse generator 60, causing the generator to produce the backstroke pulses. Switch 61 couples mating contact 56 to pulse generator 60 and removes mating contact 57 from the circuit when a transceiver is operated as a transmitter. When a transceiver is operated as a receiver, switch 61 couples mating contact 57 to pulse generator 60 and removes mating contact 56 from the circuit. Therefore, backstroke pulses are generated by a transmitter twice each revolution as contacts 50 and 51 touch mating contact 56 and are generated by a receiver twice each revolution as contacts 50 and 51 touch mating contact 57. Mating contacts 56 and 57 are mounted 90° apart to permit a scan head in a transmitter to be aligned with a print head in a receiver. The transmitter and receiver backstroke pulses are generated throughout the entire transmission period but they are used during the phasing period only for the purpose of aligning the two turrets.

Contacts 50 and 51 and mating contacts 56 and 57 comprise one method of generating the backstroke pulses. Magnetic or capacitive couplers are examples of other transducers which may be used to generate a signal indicating the position of a turret.

The leading edges of the backstroke pulses indicate that a transceiver turret is at a specific angular position relative to a reference point on the frame of the transceiver. The phase correction circuit compares the leading edges of the receiver and transmitter backstroke pulses to compute the displacement or phase angle error between the two turrets. It generates a correction pulse having a duration proportional to the phase angle error causing the receiver motor to run at a slower speed (the phasing speed) for the duration of the correction pulse causing a reduction in the frequency of the receiver backstroke pulses. The leading edges of the two pulse trains approach one another at a rate equal to the difference in their frequencies. The duration of the correction pulse is the time period required to correct the phase angle error based on the rate at which the pulses approach one another. This operation is modified in the present system by generating a correction pulse which corrects a fraction of the error. Fractional corrections are made repeatedly until the error is reduced to an acceptable minimum. The general theory of operation is explained prior to discussing the modified operation.

Figure 3:
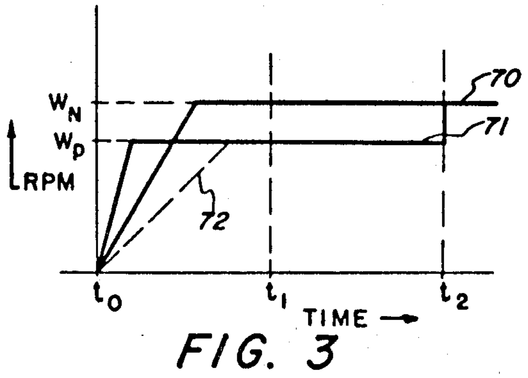
FIG. 3 illustrates acceleration curves for transceiver turret motors.

The following discussion of the phase correction circuit assumes that the transmitter and receiver turrets have been accelerated to the normal speed and to the phasing speed, i.e., a speed slower than normal turret operation speed, respectively. Referring now to FIG. 3, curves 70 and 71 are acceleration curves of transmitter and receiver turret motors, respectively. The acceleration of the turrets is assumed to be linear for purposes of this discussion. The transmitter motor accelerates from an angular velocity of zero to an rpm of $w_n$, the normal operating angular velocity of a transceiver. The receiver motor accelerates from zero to an rpm of $w_p$, the phasing angular velocity. Dashed line 72 is an acceleration curve for the receiver motor and depicts the case where a receiver motor accelerates at a slower rate than a transmitter motor.

Time $t_0$ to $t_2$ is the delay period set aside by the facsimile system to accomplish phasing. The following discussion is directed to the time period $t_1$ to $t_2$, i.e., the time when the turrets are at either velocities of $w_p$ or $w_n$. The phase correction circuit is not able to align the turrets prior to time $t_1$ because to that time the turret speeds may not be at the known velocities, $w_p$ and $w_n$.

The receiver turret may fluctuate between the $w_n$ and $w_p$ velocities prior to time $t_1$ because the correction circuit is in operation from time $t_o$ and may generate commands causing the fluctuations. The receiver turret also varies between the $w_n$ and $w_p$ velocities after time $t_1$ but this is not shown in FIG. 3 to simply the present discussion but is hereinafter explained. Time $t_2$ marks the end of the phasing period after which both turrets are operated at the normal operating speed $w_n$. To repeat, the initial condition for the following discussion is that sufficient time, i.e., $t_o$ to $t_1$, has passed to allow the transmitter and receiver turrets to accelerate from rest to speeds of $w_n$ and $w_p$ respectively.

Figures 4A, 4B, 4C:
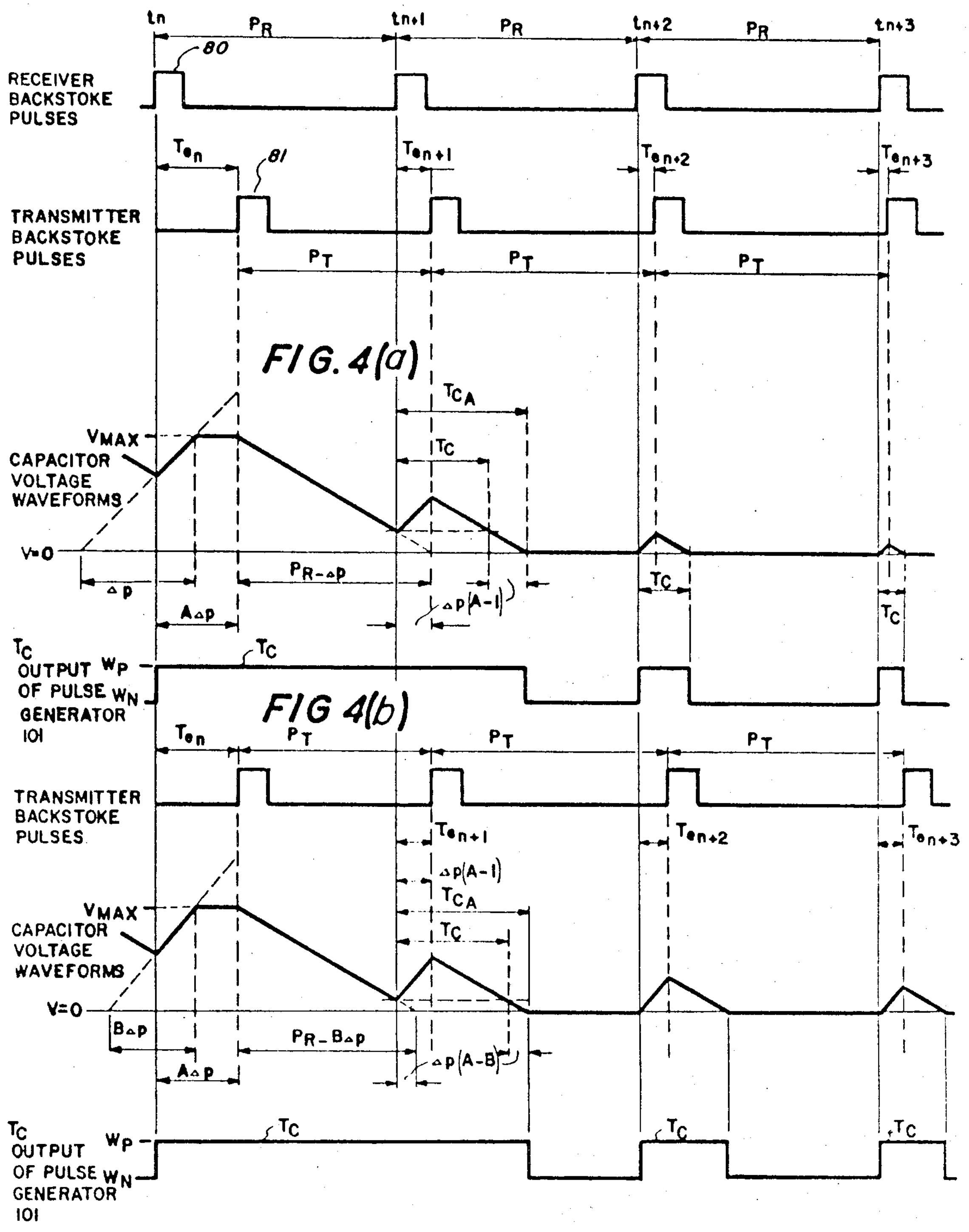
FIGS. 4(*a*), 4(*b*) and 4(*c*) are waveforms of various signals produced by the present system.

FIG. 4(*a*) depicts the receiver and transmitter backstroke pulse trains. The period of the receiver backstroke pulse $P_r$ is equal to $\pi\ w_p$ and the period of the transmitter backstroke pulse $P_t$ is equal to $\pi\ w_n$. In terms of frequency, the receiver and transmitter backstroke pulses have frequencies twice the velocities of their respective turrets because the pulses are generated twice during each revolution of the turrets. The pulse correction circuit 28 (FIG. 1) measures the time between the leading edges 80 of the receiver backstroke pulses and leading edges 81 of the transmitter backstroke pulses. The measured time lapse, $T_e$, represents the phase angle error between the two pulses and hence the phase angle error between the turrets because the pulses are generated at known angular positions during the rotation of the two turrets. The phase angle error, $T_e$, is measured relative to the leading edge of each receiver backstroke pulse. The phase correction circuit samples or inspects the phase relationship of the two turrets during each $P_r$ time period, i.e., a sample period, and has until the end of the sample period to correct the measured error prior to the next measurement.

The difference in the length of the periods of the two pulse trains is $\Delta p=P_r-P_t$. The difference $\Delta p$ is the amount by which the error, $T_e$, varies from sample period to sample period. The largest value that $T_e$ can assume is the length of the shortest pulse duration, i.e., $T_{e\ max}= P_t$. Actually, $T_e$ approaches a maximum value of $P_t$ because when $T_e=P_t$ the leading edges of the two pulses are aligned and the phase correction circuit measures an error of zero. Generally, if the error is $T_e=A$ (any arbitrary value less than $P_t$) at time $t_n$ (the start of a sample period), at time $t_{n-1}$ (the start of the succeeding sample period) the error is $T_e=A-\Delta p$. To summarize, the error $T_e$ is reduced at the rate of $\Delta p$ per sample period, i.e., $\Delta p/P_r$. The time period required to reduce the error to zero (the duration of a correction signal $T_c$) is therefore $T_e\ P_r/\Delta p$. The expression $T_e/\Delta p$ is the number of sample periods required to reduce the error to zero and the product $T_e/\Delta p \cdot P_r$ is the time encompassed by the calculated number of sample periods. The equation $T_c=P_r/\Delta p \cdot T_e$ therefore establishes the duration of a correction pulse, $T_c$, required to correct the entire error.

The equation $T_c=P_r/\Delta p \cdot T_e$ is modified to a form $T_c=P_{ra}$⅔$^{B}\Delta p \cdot T_e(B>1)$ to effect a fractional correction of the error. One reason for this is that the unmodified equation is based on the assumption that the receiver motor is capable of instantaneously switching between the $w_p$ and $w_n$ velocities. Another reason is that the multiplying circuits used to produce the desired relation between $T_c$ and $T_e$ may generate a $T_c$ which leads to overcorrection of the error if the entire error is attempted to be corrected. To illustrate this the operation of the multiplying circuit which produces the correction pulse is explained for the case where the entire error is corrected, i.e., for $T_c=P_r/\Delta p \cdot T_e$.

Figure 5:
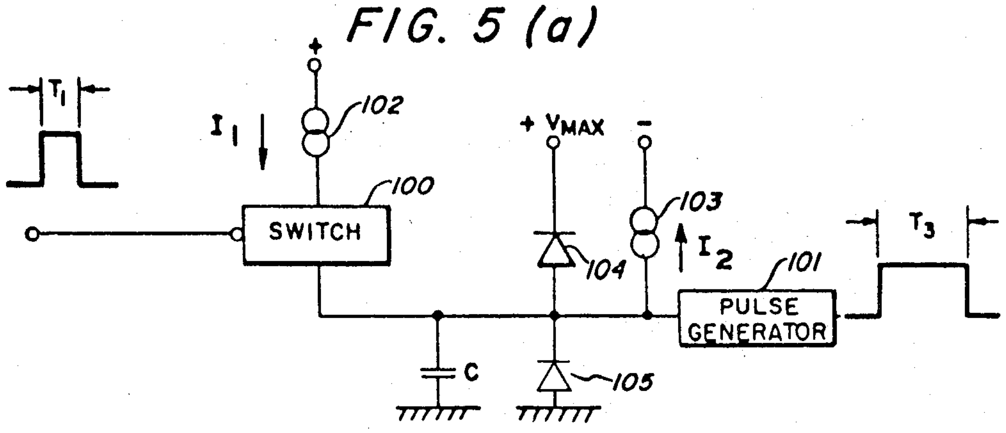
FIG. 5(*a*) is a circuit diagram of one embodiment of a multiplying circuit.
Figure 5:
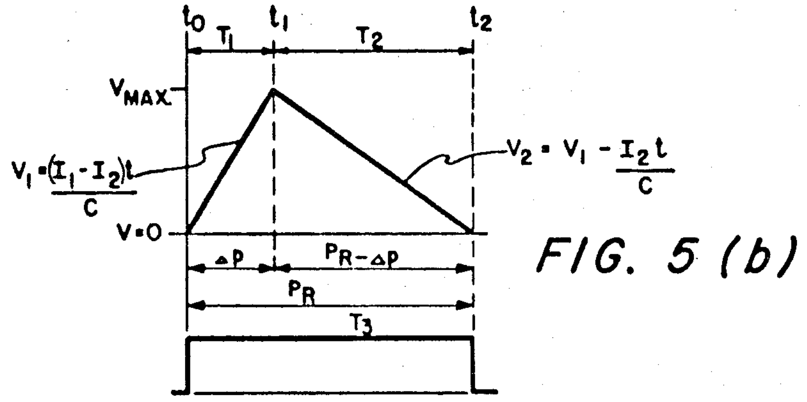

A multiplying circuit is shown in FIG. 5(*a*). The voltage waveform on capacitor C of the circuit is shown in FIG. 5(*b*). In FIG. 5(*a*), an input pulse $T_1$ turns switch 100 ON for the duration of pulse $T_1$. With switch 100 ON, current $I_1$ from constant current source 102 is applied by the switch to capacitor C. Current $I_2$ is applied to the capacitor by constant current source 103. The capacitor is charged by the currents toward Vmax according to the relation $V_1=(I_1-I_2/C)\ t$ ($t$=time). The voltage source + Vmax and diode 104 limit the voltage to which the capacitor can be charged to the +Vmax potential level. $V_1=Vmax = (I_1-I_2)/C\ T_1$, i.e., Vmax is the voltage on the capacitor when it is charged from ground potential by currents $I_1$ and $I_2$ for a length of time equal to a specific pulse width of $T_1$.

With switch 100 OFF, constant current source 102 is removed from the circuit and the capacitor is charged toward ground by constant current source $I_2$ according to the equation $V_2=V_1-(I_2/C)$ t. The time required to charge the capacitor from Vmax to ground is $T_2$. This gives rise to the expression $V_2=0=Vmax - I_2\ T_2/C$. Diode 105, coupled between the capacitor and ground prevents the capacitor from acquiring a charge below ground potential.

Pulse generator 101 coupled to Capacitor C generates pulse $T_3$ when the potential on capacitor C is above ground, i.e., generator 101 produces the leading edge of the pulse when the voltage on the capacitor rises above ground and the trailing edge when the voltage on the capacitor returns to ground. The generator can be a simple transistor switch turned ON by potentials above a specific voltage level. The duration of pulse $T_3$ is therefore equal to the sum of $T_1$ and $T_2$, i.e., $T_3=T_{1a}+T_2$.

The desired relationship between $T_1$ and $T_3$, i.e., $T_3 = I_1/I_2 \cdot T_1$ (the form of the equation $T_c=P_r/\Delta p \cdot T_e$) is obtained as follows:

$V_1=Vmax = (I_1-I_2)/C \cdot T_1$ or $T_1=Vmax\ C/I_1-I_2$ or $Vmax\ C=T_1\ (I_1-I_2)$ $V_2=0=V_{max} - I_2/C\ T_2$ or $T_2 = V_{max}C/I_2$ by definition $T_3 = T_1+T_2$ or $T_2=T_3-T_1$ hence $T_3-T_1 = V_{max}\ C/I_2$ or $T_3 = V_{max}\ C/I_2 + T_1$ substituting $V_{max}\ C = (I_1-I_2)\ T_1$ into the above equation gives $T_3 = (I_1-I_2)/I_2 \cdot T_1+T_1$ and from this is obtained the expression $T_3 = I_1/I_2 \cdot T_1$ The equation $T_c=P_r/\Delta p \cdot T_e$ for correcting the entire error is provided by the multiplying circuit by selecting values for the currents such that $I_1/I_2 = P_r/\Delta p$ and substituting $T_c=T_3$ and $T_e=T_1$. As stated previously, the maximum correction rate is $\Delta p/P_r$, i.e., with the receiver turret rotating at a velocity of $w_p$ and the transmitter turret at a velocity of $w_n$, the phase angle error, $T_e$, is reduced by an amount $\Delta p$ each sample period, $P_r$. This means that the largest error that can be corrected during one sample period is $T_e=\Delta p$. This fact is used to select the value of the voltage $V_{max}$ in the multiplying circuit. $V_{max}$ is the voltage to which the capacitor is charged when $T_1=T_e=\Delta p$, i.e., $V_1 = V_{max} = (I_1-I_2)/C\ \Delta p$. With $T_e=\Delta p$, $T_c = P_r$ as determined from the equation $T_c=P_r/\Delta p \cdot T_e$. The time required to charge the capacitor from $V_{max}$ back to ground, $T_2$, is $T_2=T_3-T_1$ from $T_3=T_2+T_1$. $T_2$ in the present case is therefore $T_2=P_{ra}-\Delta p$.

Correction pulse $T_c$ is generated by pulse generator 101 as long as the voltage on capacitor C is above ground. The pulse $T_c$ maintains the receiver turret at the phasing velocity $w_p$ while it is being generated. At the end of pulse $T_c$ the receiver turret is switched to the normal speed $w_n$. The object is to make this change in speed when the two turrets are aligned. When $T_e$ is greater than $\Delta p$, $T_c$ is greater than $P_r$, the length of a sample period, as is evident from the equation $T_c=P_r/\Delta p \cdot T_e$. This means that the voltage on capacitor C does not return to ground during a sample period when the error is greater than $\Delta p$. This does not create a problem until the error is reduced to less than $\Delta p$. At the beginning of the sample period in which the error is less than $\Delta p$, a $T_c$ having a duration less than $P_r$ must be generated in order to switch the receiver turret to the $w_n$ velocity at the instant the turrets are aligned. However, the first correction pulse having a duration less than $P_r$ may be larger than required to correct the error because charging of the capacitor toward $V_{max}$ does not start from ground potential. This is evident from inspection of FIG. 4(*b*).

The waveforms of the voltage on capacitor C for four successive sample periods is shown in FIG. 4(*b*). The error at time $t_n$ is assumed greater than $\Delta p$ and the error at time $t_{n+1}$ less than $\Delta p$. The charge on capacitor C is not reduced to ground during the $t_n$ and $t_{n+1}$ sample periods because errors greater than $\Delta p$ cause the generation of a $T_c$ greater than $P_r$. At time $t_{n+1}$, the capacitor starts charging toward $V_{max}$ from some potential above ground. This leads to the generation of an erroneous correction pulse, $T_{ca}$, because the $T_3=I_1/I_2 \cdot T_1$ relationship is valid only when the voltage waveform developed on the capacitor is symmetrical, i.e., the charge starts at a reference potential, charges to some higher potential and discharges back to the reference potential. The error at time $t_n$ is assumed $T_e = A\Delta p$ where $2>A>1$ by definition. At time $t_{n-1}$ the error is $T_e=\Delta p(A-1)$ because the error is reduced by $\Delta p$ each sample period. The proper correction pulse length for an error $T_e=\Delta p\ (A-1)$ is $T_c=P_r(A-1)$ as derived from the equation $T_c=P_r/\Delta p \cdot T_e$. The duration of the erroneous correction pulse is $T_{ca} = T_c+\Delta p\ (A-1)$. This expression for $T_{ca}$ is obtained by noting that $T_c$ is the time required to charge the capacitor from its initial value at time $t_{n+1}$ (a potential above ground) to some higher voltage and back again to the initial value, and that $\Delta p\ (A-1)$ is the additional time required to charge the capacitor from the initial value at time $t_{n+1}$ to ground. This is apparent from the inspection of the $t_n$ and $t_{n+1}$ sample periods in FIG. 4(*b*) where $A\Delta p$ (the error in the $t_n$ sample periods) + $(P_r-\Delta p)$ (the time required to charge the capacitor from $V_{max}$ to ground) − $P_r$ (the duration of a sample period) $=\Delta p\ (A-1)$.

The system corrects the error from only one direction, therefore, the overcorrection caused by pulse $T_{ca}$ introduces an error into the system. This undesirable result is eliminated by correcting the error a fractional part each sample period. This approach also compensates for the non-instantaneous response of the receiver turret motor velocity discussed later. For example, if the error is reduced one half each sample period, the relation between $T_c$ and $T_e$ is $T_c=P_r/\Delta p \cdot T_e/2$ or $T_c = P_r/2\Delta p \cdot T_e$. With this scheme, the first correction pulse of duration less than $P_r$ may still be erroneous but as long as it is less than the time required to correct the entire error no overcorrection occurs. If the erroneous pulse is less than the sample period, the voltage on the capacitor is able to return to ground potential before the end of the sample period and a proper $T_c$ is generated in the next sample period. The error is continually reduced one half in subsequent sample period until its magnitude is negligible. The length of the delay period set aside for the phasing operation is chosen to encompass a sufficient number of sample periods to insure that the error is negligible at the end of the delay period.

The general expression for correcting a fractional part of the phase angle error each sample period is $T_c=P_r/B\Delta p \cdot T_e$, where B is greater or equal to one. The multiplying circuit provides this relationship by selecting values for the currents such that $I_1/I_2 = P_r/B\Delta p$ (from $T_3=I_1/I2\ T_1$). From inspection of the general equation, it is seen that $T_c$ is less than or equal to $P_r$ whenever the error, $T_e$, is less than or equal to $B\ \Delta p$. Therefore, $B\Delta p$ is the time used to select a value for $V_{max}$ when making fractional corrections, i.e., $V_{max} = (I_1-I_2)/C \cdot B\Delta p$. With $B\Delta p$ selected as the time for the voltage on the capacitor to rise from ground to $V_{max}$, it follows that $P_r-B\ \Delta p$ is the time for the voltage to return from $V_{max}$ to ground. In discussing FIGS. 5(*a*) and 5(*b*), it was established that $T_3=T_1+T_2 \cdot T_c$ was substituted for $T_3$ and $T_e$ for $T_1$ hence $T_c=T_e+T_2$ or $T_2=T_c-T_e$. For $T_e=B\ \Delta p$, $T_c=P_r$ and, $T_2$, the time for the voltage to return from $V_{max}$ to ground, is $T_2=T_c-T_e = P_r-B\ \Delta p$.

When the error $T_e$ is greater than $B\ \Delta p$ the correction pulse $T_c$ is greater than $P_r$. During this time the error is reduced at the rate of $\Delta P/p_r$. When the error is reduced to less than $B\ \Delta p$ the rate of correction remains at $\Delta P/p_r$ but the time period over which the correction is applied is only sufficient to correct the error some fractional part, i.e., $T_e/B$.

FIG. 4(*c*) depicts the voltage waveforms on the capacitor when the error is reduced by fractional amounts. The error at time $t_n$ is assumed $T_e = A\Delta p$ where $2>A>1$. If $A>B$, the error at time $t_{n+1}$ is $\Delta p\ (A-1)$ (because for $A>B$, $T_c>P_r$ and the error is reduced $\Delta p$ during the $t_n$ sample period) which is less than $\Delta p$ by definition of A. The proper correction pulse for $t_{n+1}$ sample period is $T_c=[P_r\ (A-1)]/B$ and the erroneous correction pulse $T_{ca}$ is, $T_{ca}=[P_r\ (A-1)]/B + \Delta p\ (A-B)$ or $T_{ca}=T_c+\Delta p\ (A-B)$.

The amount that $T_{ca}$ is greater than $T_c$ is the time required to charge the capacitor to ground from the potential on the capacitor at time $t_{n+1}$. This time is $A\Delta p$ (the error at the $t_n$ sample period) + $(P_r-B\Delta p)$ (the time required to charge the capacitor from $V_{max}$ to ground) − $P_r$ (the duration of a sample period) = $\Delta p\ (A-B)$ as determined by inspecting the $t_n$ and $t_{n+1}$ sample periods of FIG. 4(*c*).

If $T_c$ (the fractional correction) is less than or equal to $T_{ca}$, and $T_{ca}$ is equal to or less than $BT_c$ (the entire correction required) and $BT_c$ is less than or equal to $P_r$ (the sample period) the error is corrected by an amount less than the total correction required and a proper correction pulse will be generated in the next sample period because the charge on capacitor C returns to ground before the beginning of the succeeding sample period. This is established as follows:

$T_c < T_{ca}$ is shown above, i.e., $T_{ca}=T_c+\Delta p\,(A-B)$ $T_{ca}=[P_r\,(A-1)]/B+\Delta p\,(A-B) < BT_c = P_r\,(A-1)$.

This expression is true for proper selection of values for A and B. e.g., A = 7/4, B = 6/4, (A–B) = 1/4 and (A–1) = 3/4 and $(P_r \cdot 1/4)/6/4+\Delta p \cdot 1/4 < P_r \cdot 3/4$ or $2P_r/3+\Delta p < 3P_r$ but $\Delta p = P_r - P_t$ and $2/3\, P_r + P_r < 3P_r = P_t$ or $5/8\, P_r < 3P_r + P_t$ which is true because $P_r$ is greater than $P_t$.

$BT_c = P_r\,(A-1) < P_r$.

This expression is true because (A–1) is less than 1 by definition of A, i.e., 2>A>1.

The foregoing approach for generating a variable width pulse to align the angular position of two rotating turrets, or shafts, can be varied in numerous ways. One variation is to reset the charge on the capacitor in the multiplying circuit to ground potential at the end of each sample period. This insures that the first correction pulse $T_c$, less than $P_r$, is a proper magnitude, i.e., eliminates the generation of the erroneous correction pulse $T_{ca}$. This scheme may be accomplished in one way by using two multiplying circuits to generate the correction pulse. The two circuits alternately generate a correction pulse in successive sampling periods. In this way, while one circuit is generating a correction pulse the other circuit is charging its capacitor toward ground.

Another technique for eliminating the erroneous correction pulse $T_{ca}$ is to choose the voltage $V_{max}$, such that the capacitor voltage is clamped to $V_{max}$ for longer than $\Delta p$ for complete discharge to take place during $P_r$. This means that no erroneous error will be carried over into the next sample period when the error becomes less than $\Delta p$, eliminating the possibility of an erroneous pulse $T_{ca}$.

The use of two circuits also comprises a scheme for a two-direction correction system. One circuit generates a pulse to command the receiver turret to accelerate to a velocity above the normal operating speed of $w_n$ and the other circuit generates a pulse to command the turret to decelerate to a velocity below the normal operating speed. Another variation to the described method is to set the length of the sample period equal to the correction pulse. This is accomplished by removing the voltage limiting diode from the multiplying circuit and by prohibiting the generation of the correction pulse until the charge on the capacitor is returned to a ground potential.

All of the foregoing methods may be altered so that a signal is produced which varies in amplitude or frequency rather than in pulse width. A variable amplitude signal is particularly adaptible to the variable speed correction system mentioned earlier. The amplitude of the pulse is applied to a variable speed motor to continuously vary the speed of the motor until the two shafts or pulses are in phase.

Figure 6:
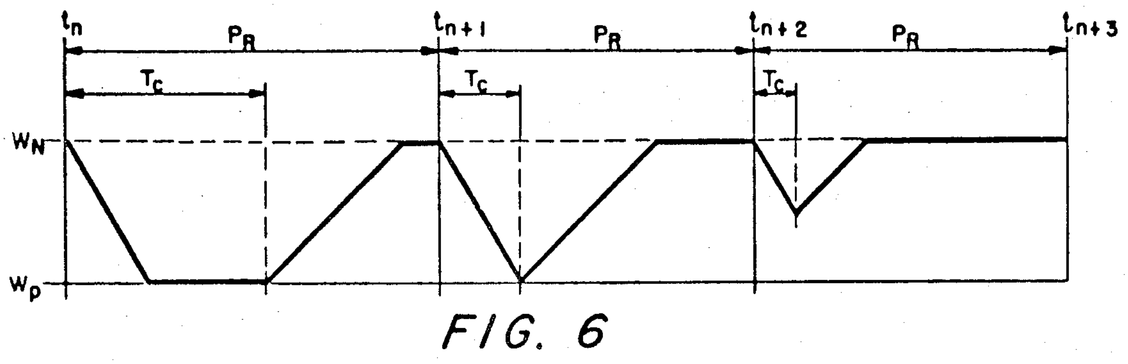
FIG. 6 is a plot of the receiver turret motor velocities during phasing of the transceiver turrets.

As mentioned at the beginning of the discussion of the present system, the response of the receiver turret motor is assumed to be instantaneous, i.e., the motor was assumed to be able to change from rpm of $w_p$ to $w_n$ instantaneously. In reality, the motors require a finite period of time to decelerate and to accelerate. FIG. 6 depicts the velocity curves of the receiver turret during three successive sample periods. The acceleration and deceleration of the motor is assumed to be linear, thereby providing a first order approximation of the motor behavior. In addition, the motor is assumed to require twice as much time to accelerate from $w_p$ to $w_n$ as to decelerate between the two velocities. Time $t_n$ is a point at which the error is reduced to less than $B\Delta P$ and the correction pulse generated for the particular sample period is of proper duration. The area below the $w_n$ velocity level, bounded by the curve, is the phase angle change that the receiver motor undergoes when correction pulse $T_c$ is generated. When the error is large, this area is trapezoidal and the area is substantially equal to the area of a rectangle. Therefore, a change in the length of $T_c$ causes substantially a linear change in the area and hence a linear change in phase angle. As the error becomes small, the area assumes a triangular shape, e.g., as shown in the sample periods beginning at times $t_{n+1}$ and $t_{n+2}$. In this case, a change in the correction pulse length (the base of the triangle) causes a change in area (phase angle) proportional to the square of the correction pulse according to the laws of geometry.

Figure 7:
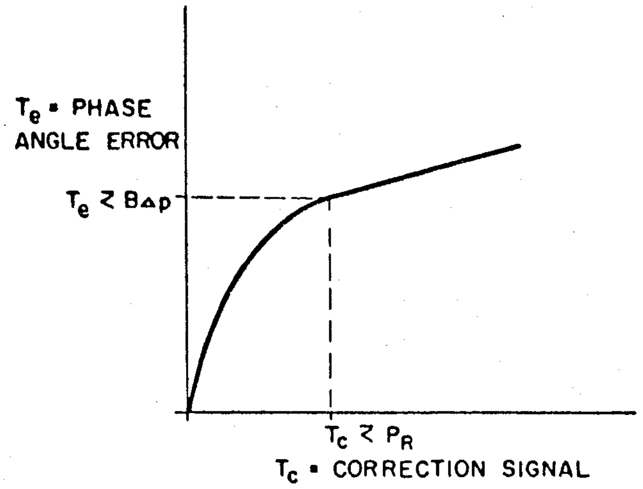
FIG. 7 is a curve of phase angle error plotted against the correction signal generated by the phase correction circuit.

The present phasing system therefore provides a non-linear circuit for controlling the non-linear characteristics of a motor. When the phase angle error is large, changes in the receiver turret speed are infrequent and the relation between $T_c$ and $T_e$ may be treated as if it were linear. When the error is small, the receiver motor is continually changing speed in a non-linear fashion thereby requiring the circuit to provide a non-linear relation between $T_c$ and $T_e$. FIG. 7 illustrates the relation between $T_c$ and $T_e$ provided by the phase correction circuit. The non-linear portion of the curve follows a square law relationship and is obtained by selecting the parameters (current and voltage values) of the multiplying circuit to approximate the non-linear characteristics of the receiver turret motor. The non-linear characteristic of the turret motor must be compensated for to prevent overcorrection or overshoot by the system. The matching or approximating of the motor characteristics by the present method is further justified because the error is corrected by a fractional part each sample period.

Figure 8:
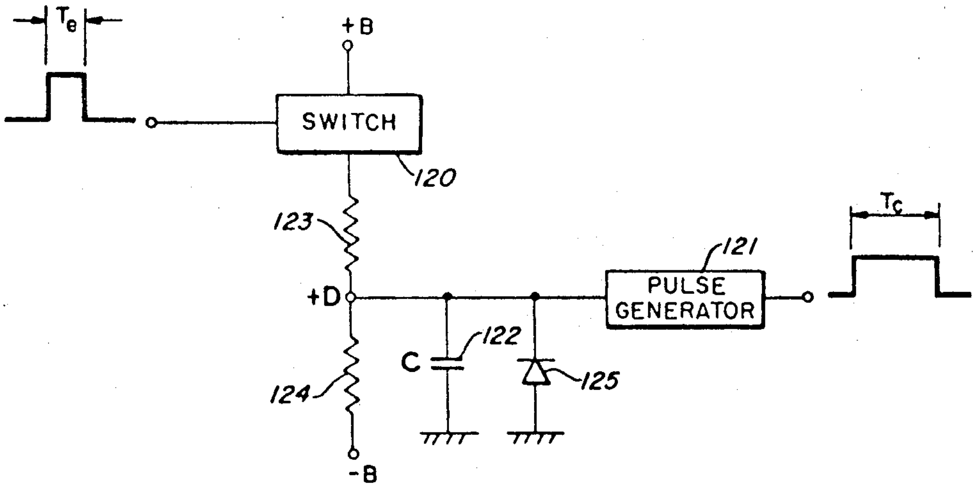
FIG. 8(*a*) is a circuit diagram of another embodiment of a multiplying circuit.

The circuit in FIG. 8(*a*) is another multiplying circuit which is compatible with the present system. The circuit in FIG. 8(*a*) uses constant potential sources rather than constant current sources to generate the desired voltage waveforms on the capacitor. The charging rate of the capacitor voltage is expotential rather than linear in this case. The charging time constants of the circuit are selected so that the voltage waveforms of this circuit approximate those in FIG. 4(*c*). FIG. 8(*b*) shows the waveform of the voltage on capacitor C (FIG. 8(*a*)) for a large error and FIG. 8(*c*) for a small error.

FIG. 8(*b*) illustrates the voltage waveform on the capacitor when the error is large, i.e., the waveform generated when the correction pulse, $T_c$, is greater than the length of the sample period, $P_r$. This waveform produces the same results as that in the $t_n$ sample period of FIG. 4(c). There an error greater than B Δ P causes the voltage on the capacitor of FIG. 5(a) to reach $V_{max}$ and to remain there for a period of time before charging back toward ground potential. This curve is approximated by the exponential curves produced by the circuit in FIG. 8(a).

Figure 8B:
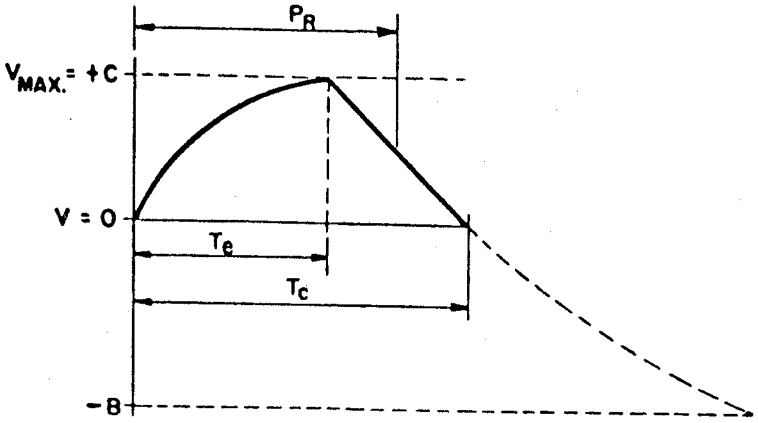
Figure 8C:
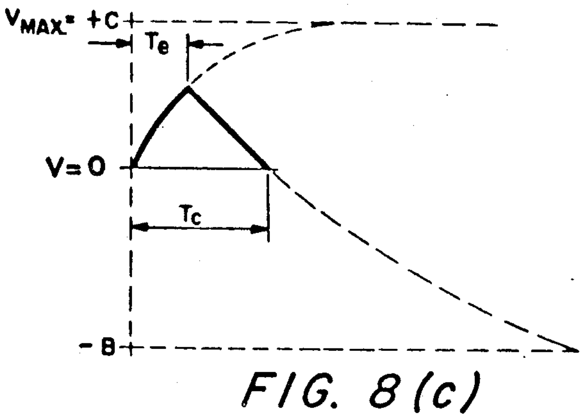

FIG. 8(c) illustrates the shape of the waveform on the capacitor in FIG. 8(a) when the correction pulse is less than the duration of a sample period. The waveform assumes substantially the shape of the waveforms produced by the circuit in FIG. 5(a) as seen in the $t_{n+2}$ and $t_{n+3}$ sample periods of FIG. 4(c). In this case the magnitudes of the voltages on the FIG. 8(a) capacitor do not exceed the linear portions of their charging curves. When the error is small, the waveforms of the voltage on the capacitor is linear as it charges toward $V_{max}$ and as it charges toward ground. That is, the initial portions of the exponential charging curves are linear and approximate the curves produced by the circuit of FIG. 5(a) for small errors.

It is necessary that the transmitter backstroke pulse and the receiver backstroke pulse, through single shot 151, are DC coupled to flip-flop 150 so that erroneous error pulses are not generated.

The multiplying circuit of FIG. 8(a) operates in the following manner. The error pulse $T_e$ turns switch 120 ON. With switch 120 ON, capacitor 122 is charged toward a potential B+ through resistor 123. The charge on the capacitor increases exponentially toward a potential of +D which is determined by the voltage divider network between +B and −B comprising resistors 123 and 124. Switch 120 returns to its normally OFF condition at the end of the error pulse $T_e$. At this time capacitor 122 begins to charge toward the −B potential through resistor 124. Diode 125 prevents the capacitor from charging to the −B potential and holds the potential on the capacitor at some small value below ground. Pulse generator 121 is turned ON when the voltage on the capacitor is above ground potential, thereby generating the leading edge of the correction pulse. The trailing edge of the pulse $T_c$ is generated when he voltage on the capacitor returns to ground, turning pulse generator 121 OFF. Switch 120 and pulse generator 121 may comprise simple transistor switches.

Figure 9:
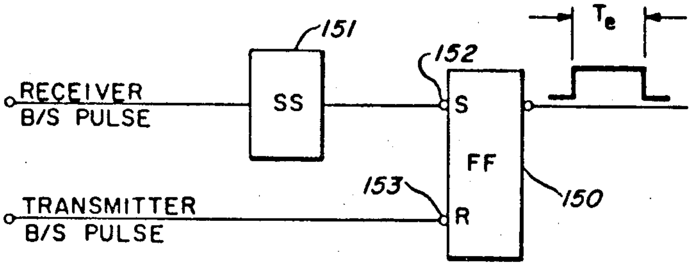
FIG. 9 is a circuit used to generate the error signal indicating the phase angle error between turrets.

The error pulse, $T_e$, is generated by the circuit in FIG. 9. This circuit may be used with the multiplying circuits of either FIG. 5(a) or 8(b). Flip-flop 150 generates the error pulse $T_e$ by recording the time lapse between the leading edges of the receiver and transmitter backstroke pulses. The input signals are direct coupled to the flip-flop, i.e., when the voltage at an input terminal is at or above a predetermined trigger level, the state of the flip-flop is changed. The flip-flop is triggered to an on state by a signal applied to set terminal 152 and to an OFF state by a signal applied to the reset terminal 153. If the flip-flop is in an ON stage when a signal is applied to the set terminal it remains ON and likewise it remains OFF if a signal is applied to the reset terminal while it is in an OFF state. By applying a receiver backstroke pulse to the set terminal of the flip-flop and the transmitter backstroke pulse to the reset terminal, the sample period is made equal to the period of the receiver backstroke pulse, $P_r$. In this way the error pulse $T_e$ is generated at the beginning of each period of the receiver backstroke pulse and is a measurement of the time lapse between the leading edge of a receiver backstroke pulse and the leading edge of a transmitter backstroke pulse.

The receiver backstroke pulse is applied to single shot multivibrator 151 before it is applied to the set terminal of the flip-flop in order to prevent the generation of an erroneous error pulse. The duration of the receiver backstroke pulse is longer than the transmitter backstroke pulse because the receiver turret is rotated at a slower speed. Therefore, if the receiver backstroke pulse is applied directly to the set terminal an erroneous error pulse generated when the leading edges of the two pulses occur simultaneously. When receiver and transmitter backstroke pulses are simultaneously applied to the set and reset terminals in the flip-flop, the flip-flop remains in an OFF state. If the receiver backstroke pulse is not shortened, however, the flip-flop is turned ON at the end of the transmitter backstroke pulse because the receiver backstroke pulse being longer, continues to apply a voltage to the set terminal after the transmitter pulse subsides. The flip-flop is not turned OFF until the receipt of the next transmitter backstroke pulse thereby giving rise to a large and erroneous error signal. The single shot multivibrator shortens the receiver backstroke pulse so its duration is less than the transmitter backstroke pulse and the problem is eliminated.

The flip-flop is maintained in an OFF state following the phasing period because the transmitter backstroke pulse continues to be applied to the reset terminal and the receiver backstroke pulse is removed from the set terminal.

DC coupling also reduces the possibility of noise from triggering the flip-flop.

The foregoing description is directed to aligning facsimile transceiver turrets. The methods and circuits herein disclosed have equal application in other systems where it is desired to obtain a particular phase angle relation between a plurality of rotating shafts or between two or more pulse trains.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A multiplying circuit comprising a pulse generator, having input and output terminals, for generating an electrical signal, $T_3$, at said output terminal when a voltage above a reference voltage level is at said input terminal, a capacitor, having first and second terminals, coupled to said input terminal of said generating means at said first terminal and to said reference voltage level at said second terminal, a diode, having anode and cathode electrodes, coupled to said capacitor first terminal at said cathode electrode and to said reference voltage level at said anode electrode, said diode preventing said capacitor from being charged to a voltage below said reference voltage level, a first constant current source having an output current $I_1$, a second constant current source having an output current $I_2$ coupled to said capacitor first terminal, and switching means, having input, output and switching terminals, coupled to said first current source at said input terminal and to said capacitor first terminal at said output terminal, to apply said current $I_1$ to said capacitor when an electrical pulse signal $T_1$ is at said switching terminal, said capacitor being charged by current $I_3=I_1-I_2$ for the duration of pulse $T_1$ and thereafter by current $I_2$, the voltage on said capacitor, when a potential above said reference voltage level, causing the generation of pulse $T_3$ at the output of said pulse generating means, the relation between pulse $T_3$ and $T_1$ being substantially $$T_3=(I_1 \cdot T_1)/I_2$$

2. A multiplying circuit according to claim 1 further including means to limit the voltage on said capacitor to a maximum value.

* * * * *